United States Patent [19]

Wohleber et al.

[11] 4,039,647

[45] Aug. 2, 1977

[54] PRODUCTION OF ALUMINUM CHLORIDE

[75] Inventors: David A. Wohleber, Lower Burrell; C. Norman Cochran, Oakmont, both of Pa.

[73] Assignee: Aluminum Company of America, Pittsburgh, Pa.

[21] Appl. No.: 644,416

[22] Filed: Dec. 24, 1975

[51] Int. Cl.$^2$ .......................... C01F 7/60; C01F 7/58; C01F 7/56
[52] U.S. Cl. .................................. 423/495; 423/136; 423/137; 423/496; 423/DIG. 12
[58] Field of Search .................... 423/495, 496, 659 A, 423/136, 137

[56] References Cited

U.S. PATENT DOCUMENTS

| 1,474,479 | 11/1923 | Jacobson | 423/495 |
| 1,541,068 | 6/1925 | Pelzer et al. | 423/495 |
| 3,832,452 | 8/1974 | Crouch, Jr. | 423/495 |
| 3,938,969 | 2/1976 | Sebenik et al. | 423/495 |

FOREIGN PATENT DOCUMENTS

| 1,061,757 | 7/1959 | Germany | 423/495 |
| 668,620 | 3/1952 | United Kingdom | 423/495 |
| 1,270,126 | 4/1972 | United Kingdom | 423/495 |
| 146,301 | 6/1962 | U.S.S.R. | 423/495 |

OTHER PUBLICATIONS

Handbook of Chem. and Physics, 43rd Ed., 1961, p. 1740. Chem. Rubber Pub. Co., Cleveland, Ohio.

Primary Examiner—Edward Stern
Attorney, Agent, or Firm—Andrew Alexander

[57] ABSTRACT

An improved method is disclosed for producing aluminum chloride by contacting aluminum oxide, a reducing agent, and chlorine in a molten bath of aluminum chloride and metal halide to form aluminum chloride which is recovered from the bath by sublimation. The improvement comprises increasing the rate of formation of aluminum chloride by adding a source of metal selected from the group consisting of iron, chromium, copper, europium and cerium to the molten bath.

11 Claims, 1 Drawing Figure

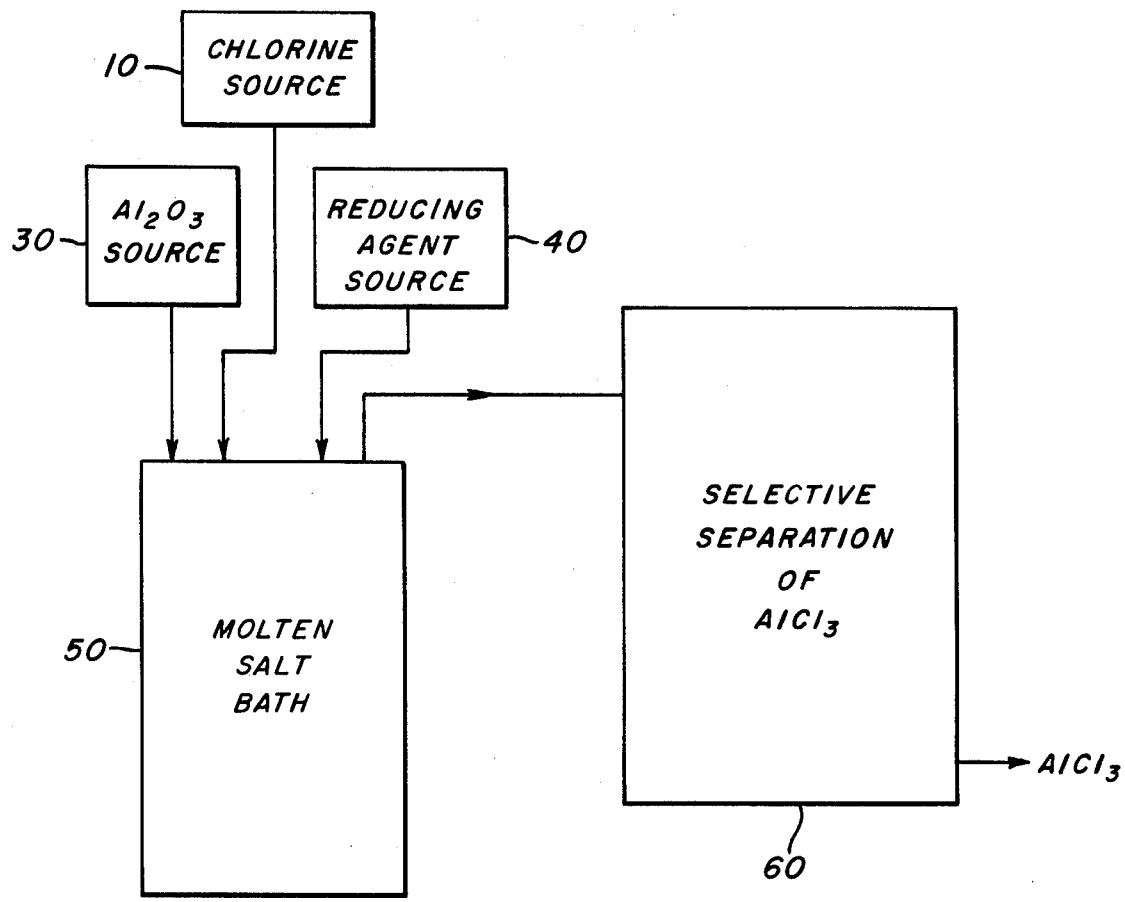

PRODUCTION OF ALUMINUM CHLORIDE

CROSS REFERENCE TO RELATED APPLICATION

This application contains subject matter relating to application Ser. No. 639,995, entitled "production of Aluminum Chloride", filed Dec. 12, 1975 in the names of Warren E. Haupin, John A. Remper and M. Benjamin Dell.

BACKGROUND OF THE INVENTION

This invention relates to the production of aluminum chloride in a molten salt bath and particularly to increasing the rateof formation of aluminum chloride.

Because of the continuing interest in producing aluminum by electrolysis of aluminum chloride there has been considerable effort expended in optimizing the formation of aluminum chloride in the process of reacting alumina containing material with chlorine and with reducing agents such as carbon.

In the prior art, British Pat. No. 668,920 teaches the catalytic acceleration of the formation of aluminum chloride by alkali aluminum chloride. However, in that patent the reaction is carried out by contacting pulverulent alumina and alkali aluminum chloride with chlorine and carbon monoxide gases in a shaft furance wherein the particulate solids are apparently suspended by the flow of the gases to prevent the particles from collapsing to form a dense mass.

In an article titled *The Production of Anhydrous Chloride from γ-Alumina in a Fluidized Bed*, by Hille and Durrwachter, Angew. Chem. Internat. Edit. Vol. 72, 1970, pp. 73–79, it is suggested that iron, alkali metals and alkaline earth metals have a favorable effect on the aluminum chloride formation. That article concerns itself primarily with the formation of aluminum chloride in a fluidized bed which consists of alumina, gas and finely dispersed catalytically acting drops of molten sodium aluminum chloride. The article notes, however, that if the fluidzed bed becomes fully loaded with sodium aluminum chloride melt, a rapid decrease in the reaction is experienced.

Such processes, while evidently producing aluminum chloride suitable for use as Friedel-Crafts catalyst or even for the electrolytic production of aluminum, tend to generate effluent dust containing many undesirable materials such as carbon, sodium aluminum chloride, carbon monoxide, phosgene, etc. which must be recaptured and separated to prevent the waste of chlorine values therein for economical reasons and to further prevent their escape to the atmosphere for ecological reasons.

The present invention provides for an improved process for the formation of aluminum chloride from alumina bearing materials, a chlorinating agent and a reducing agent in a molten salt bath by addition thereto of particular catalytic materials.

SUMMARY OF THE INVENTION

The principal object of this invention is to provide an improved system for the production of aluminum chloride.

Another object of this inventinn is to provide an improved process for the production of aluminum chloride by the reaction of sources of aluminum oxide, a reducing agent and chlorine in a molten salt bath by addition of catalytic materials.

These and other objects will become apparent from the description which follows.

In accordance with these objectives aluminum chloride formed by contacting a source of aluminum oxide and a source of chlorine with a reducing agent in a molten salt bath can be increased by adding a metal selected from the group consisting of iron, chromium, copper, europium and cerium, as well as their salts or oxides to the molten bath.

BRIEF DESCRIPTION OF THE DRAWING

In the description below the refrence is made to the sole FIGURE which is generally a schematic representation illustrating a system for producing aluminum chloride.

DESCRIPTION OF THE EMBODIMENTS OF THE INVENTION

The figure shows a schematic of a system for producing aluminum chloride wherein aluminum oxide source 30, chlorine source 10 and reducing agent source 40 are introduced into a molten bath, generally referred to as 50, wherein these materials react to form aluminum chloride. The alumina and reducing agent can be metered to the bath by any suitable means (not shown) well known in the art. The chlorine, which may be in liquid or gaseous or other form, can be introduced to the bottom of the bath and allowed to move or bubble to all areas of the bath. The aluminum chloride formed from these reactants preferably is recovered from the bath by vaportization and is thereafter purified by selective separation 60 to remove other materials emanating from the bath therewith. Such materials emanating from the bath can include the reducing agent, aluminum oxide, and other materials which would lead to an impure aluminum chloride product. After the aluminum chloride has been separated from such materials, it can be consdensed and removed.

Returning now to material suitable for forming $AlCl_3$ in the molten bath 50, the aluminum oxide which can be used in accordance with the present invention may be an unrefined oxide which includes, for example, clays, bauxite, anorthite, red mud, feldspar and shale. However, because of the impurities that can be introduced and the separation processes required to remove such impurities, for example silicon chloride it is preferred that the aluminum oxide is alumina which is intended to mean an aluminum oxide product after the same has been extracted from its ores. The well known Bayer process is one source of such alumina in which bauxite ore is digested with caustic soda to selectiely dissolve the aluminum content as sodium aluminate while leaving behind impurities such as iron, silicon, and titanium. In this process, alumina is recovered as Bayer hydrate,, i.e. $Al(OH)_3$ which is subsequently calcined to remove most of the water since it is preferred that the alumina used in the present invention have a low hydrogen and water content. Hydrogen and hydrogen bearing compounds react to form hydrogen chloride resulting in the loss of valuable chlorine. Such calcining can be carried out in kilns or furnaces at a temperature of 600° to 1200° C. Considerable low surface area alumina such as alpha alumina may be formed in the high temperature range while gamma alumina predominates at the lower end of the range. Both forms of alumina can be used advantageously in the present invention.

Chlorine suitable for use in the present invention can be $Cl_2$ in liquid or gaseous form. Other chlorinating materials which can be used include, for example, phosgene or carbon tetrachloride or the like.

The present invention contemplates the use of any suitable reducing agent. More specifically, a suitable reducing agent can be selected from the group consisting of carbon, sulfur, antimony, phosphorous and carbon monoxide. The most preferred reducing agent is solid carbon. The source of carbon be coal or coke or petroleum as well as purified carbon obtained therefrom and preferably such carbon is ground or milled a size of less than 200 mesh (Tyler series).

In the present invention reactants in the bath should present in excess by which is meant the source of alumina and the reducing agent should be present in excess of the stoichiometric amount of the chlorinating material. Thus, preferably, the bath initially contain carbon in a ratio of about 1 to 3 pounds per pound of bath. Thereafter carbon should be added stoichimetrically with the other material such s chlorine and alumina. also, preferably, the alumina be present initiallt in excess of the stoichiometric amount of the chlorinating material. Thus, alumina should be present in the molten bath in a ratio of about 1.0 to 9.0 pounds per pound of bath and thereafter it should be added at least stoichiometrically with chlorine.

The molten bath 50 in its broadest aspect can be any material which acts as a solvent for the aluminum oxide. The bath can comprise aluminum chloride and one or more metal halides selected from the group consisting of alkali metal halide and alkaline earth metal halide as well as alkali metal-alumino-halide compounds such as cryolite and chiolite. The preferred alkali metal halide is sodium chloride.

In accordance with the present invention, it has been discovered that the production of aluminum chloride from the above mentioned reactants in the molten salt bath 50 can be accelerated by the use of specific catalytic metals selected from the group consisting of iron, chromium, copper, europium and cerium. Also, useful are the salts thereof. The use of the term salt herein is intended to include oxides. The halides of such metals are preferred and among the halides the chloride is particularly preferred. Of the chlorides, ferric, chromium, cuprous and cupric chlorides are more preferred. Cuprous and curpic chlorides are most preferred for reasons which will be explained below.

In the present invention the bath can be operable from the melting point to the boiling point of materials consituting the reaction bath. Thus, when the molten bath comprises 30% sodium chloride and 70% aluminum chloride, by weight, a very suitable operating temperature of the bath is in the range of 780° C to 815° C. At this temperature when the reactants are added to the bath in suitable proportions as mentioned above, and ferric chloride or chromium chloride are added, it has been found that either of these materials are quite volatile, consequently efffluent emanating from the bath may be contaminated with such catalytic materials requiring a fractionation or selective separation step. However, when the bath, as described immediately above, is catalyzed with cupric or cuprous chloride, contamination due to the volatility of the catalytic material is substantially non-existent since such catalytic material has a relatively low volatility in the temperature range of 780° to 815° C. Thus, cupric and cuprous chloride do not have to be replenished. For these reasons, cupric and cuprous chloride are most preferred. Of the two forms of copper chloride, the use of cupric chloride results in the highest yield.

The concentration of cuprous chloride (CuCl) in a 100 parts of molten reaction bath comprising sodium chloride and aluminum chloride can range from about 0.077 to 42 parts. Preferably, the cuprous chloride concentration is in a range of about 0.077 to 1 parts.

The concentration of cupric chloride ($CuCl_2$) in a 100 parts molten bath material can be 0.05 to 33 parts with 0.05to 5 parts being preferred.

With respect to ferric chloride ($FeCl_3$), the concentration can range from 0.05 to 10 parts per 100 parts of bath material with a preferred with a range being 0.05 to 5 parts.

With respect to chromium chloride ($CrCl_3$), the concentration can range from 0.05 to 10 parts per 100 parts of bath material with a preferred range being 0.05 to 5 parts.

While various materials have been described individually which have been discovered to accelerate the reaction for the formation of aluminum chloride from alumina, chlorine and a reducing agent in a molten salt bath, it should be understood that it is contemplated to be within the purview of the present invention to use such materials in combination and to have beneficial results therefrom.

Thus, while it is already known to design apparatus to get 100% conversion, very large scale apparatus must be used. That is, it is possible to get 100% conversion using a large reactor without using the catalyst of this invention. However, by using the catalyst of this invention, it is possible to get the same percent conversion and amount of yield using a much smaller reactor which can result in considerable savings.

In the following examples for illustrative purposes, an undersized reactor was used to obtain considerably less than 100% conversion.

EXAMPLE 1

A molten bath comprising a mixture of 390 gms of sodium chloride and 920 gms of aluminum chloride was brought to a temperature of about 788° C. To this mixture was added about 325 gms of coke ground to a mesh size (Tyler Series) of about −100 and about 50 gms of alumina ground to a mesh size of −100. Thereafter, chlorine gas was added to the bottom of the bath at about a rate of 300 cubic centimeters/ minutes S.T.P. which resulted in 41% of such chlorine being converted to aluminum chloride. Afterwards, 1.0 gms of cupric chloride per 100 gms of $NaCl-AlCl_3$ were added and it was discovered that with the identically sized apparatus 84% of the chlorine gas was converted to aluminum chloride. This is a 43% increase in chlorine converted to aluminum chloride.

EXAMPLE 2

A molten bath mixture as in Example 1 was placed in a reactor container having a 8.375 inch deep coke bed weighing about 223 gms. The coke size was such that it would pass through a size 3 mesh screen but be retained on a size 4 mesh screen (Tyler series). To this system was added about 50 gms of alumina ground to a mesh size of −100. Thereafter, chlorine was added to the bottom of the bath at about a rate of 300 cubic centimeters/minute S.T.P. which resulted in 52% of such chlorine being converted to aluminum chloride. Afterwards, 0.077 gms cuprous chloride per 100 gms of NaCl—AlCl₃ were added and it was discovered that 73% of the chlorine gas was converted to aluminum chloride. This is a 21% increase in chlorine converted to aluminum chloride.

EXAMPLE 3

A molten bath was prepared in substantially the same manner as in Example 1, except 1.0 gm of ferric chloride was added per 100 gms of NaCl—AlCl₃. The temperature of the molten bath was 794° C. The chlorine converted to aluminum chloride was 69% which was an increase of 30% compared to the uncatalyzed bath.

EXAMPLE 4

A molten bath was prepared as in Example 2, except 1.0 gm of chromium chloride was added. Chlorine converted to aluminum chloride was 53% an increase of 13% compared to the uncatalyzed molten bath.

Advantageously, therefore, aluminum chloride production in a molten metal salt bath using reactants which include a source of aluminum oxide, a reducing agent and a chlorinating agent can be accelerated by the addition of certain materials. Thus, by the addition of certain catalytic materials, for example, CuCl₂, the production of aluminum chloride can be enhanced by 105 percent without increasing the size of the molten salt bath. Or conversely, substantially the same aluminum chloride production rate can be maintained by the addition of catalytic materials thereto even though the size of the molten bath and therefore the constituents added thereto are decreased by as much as 50 percent.

Another advantage of using the catalyzed system of the invention for the production of aluminum chloride resides in the fact that materials of construction for containing the molten bath can be less critical than those used otherwise. That is, by utilizing the catalysts of the present invention, aluminum chloride can be produced in a molten bath at temperatures below that in the uncatalyzed system and the same production rate achieved. Thus, at the lower temperature, the materials of construction are less prone to attack by the molten bath materials. An additional advantage of the lower temperature and smaller bath size as mentioned above resides in the fact that the heat input can be less.

While the invention has been described in terms of preferred embodiments, the claims appended hereto are intended to encompass all embodiments which fall within the spirit of the invention.

What is claimed is:

1. In an improved method of producing AlCl₃ by contacting alumina and a reducing agent with a source of chlorine in a molten bath comprisng AlCl₃ and metal halide to form AlCl₃ and by recovering the AlCl₃ by vaporization from the bath, the improvement which comprises, adding a source of metal selected from the group consisting of iron, chromium, copper, europium and cerium to the molten bath to increase the rate of formation of said aluminum chloride by catalytic action of said metal.

2. The method according to claim 1 wherein the reducing agent is carbon.

3. The method according to claim 1 wherein the reducing agent is carbon monoxide.

4. The method according to claim 1 wherein the metal halide of the bath is selected from the group consisting of alkali and alkaline earth metal halide.

5. The method according to claim 1 wherein the source of metal is a metal halide.

6. The method according to claim 5 wherein the metal halide is a metal chloride.

7. The method according to claim 6 wherein the metal chloride is selected from the group consisting of FeCl₃, CrCl₃, CuCl and CuCl₂.

8. The metal according to claim 6 wherein the metal chloride is selected from the group consisting of CuCl and CuCl₂.

9. The method according to claim 6 wherein the bath is operated at a temperature in the range of 780° to 815° C.

10. In an improved method of producing AlCl₃ by contacting alumina and a carbonaceous reducing agent with chlorine in a molten bath comprising AlCl₃ and NaCl to form AlCl₃ and by recovering the AlCl₃ by vaporization from the bath, the improvement which comprises, adding to the bath a metal chloride selected from the group consisting of FeCl₃, CrCl₃, CuCl and CuCl₂ to increase the rate of formation of said aluminum chloride by catalytic action of the metal of said chloride, said bath being kept at a temperature in the range of 780° to 815° C.

11. The method according to claim 1 wherein the source of metal is a metal oxide.

* * * * *